May 6, 1958

R. F. LO PRESTI 2,833,395

SUPPORT ASSEMBLY FOR CONVEYOR

Filed April 22, 1955

INVENTOR.
Roy F. Lo Presti
BY
Murray A. Gleeson
ATTORNEY

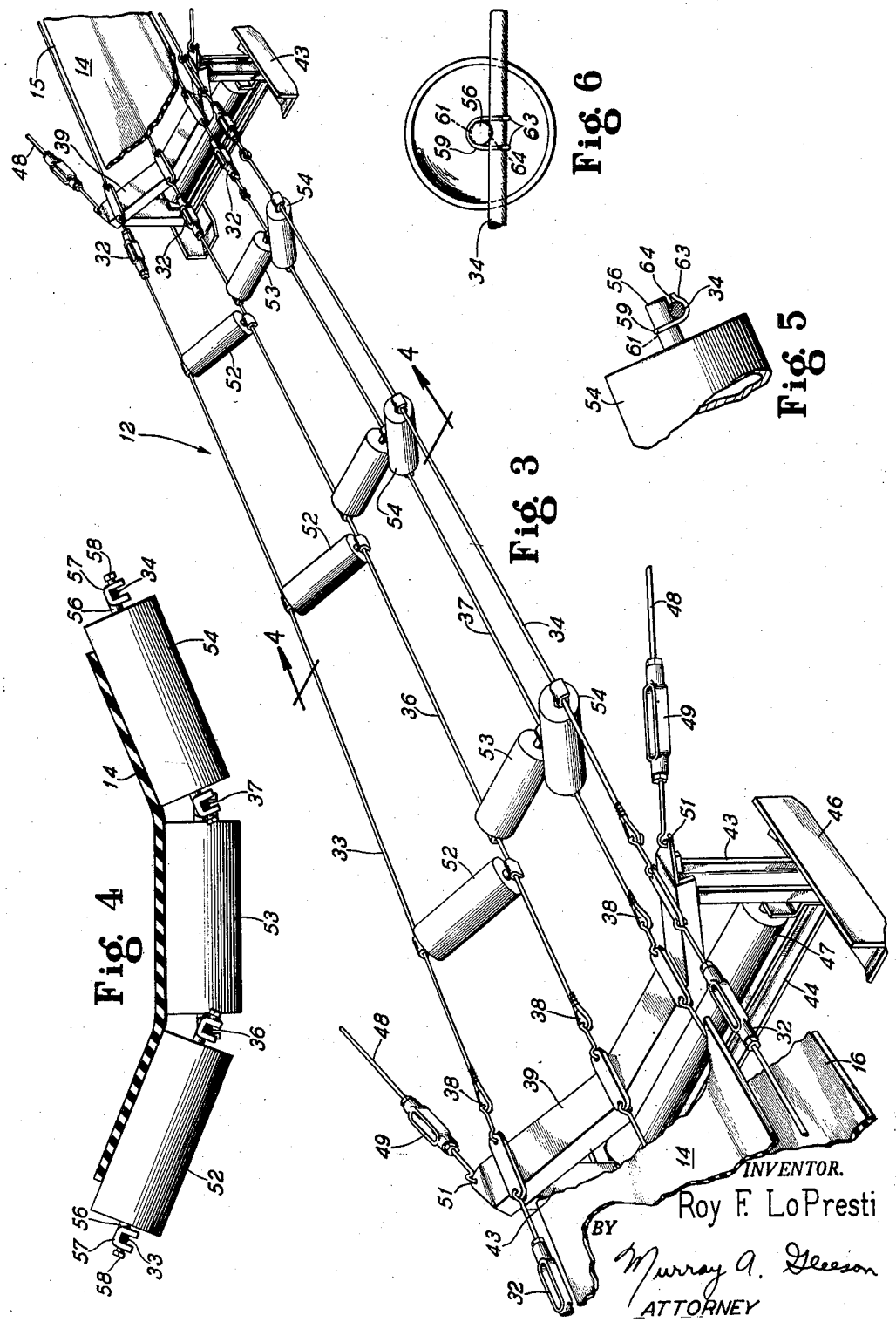

United States Patent Office 2,833,395
Patented May 6, 1958

2,833,395
SUPPORT ASSEMBLY FOR CONVEYOR

Roy F. Lo Presti, Chicago, Ill., assignor to Goodman Manufacturing Company, Chicago, Ill., a corporation of Illinois Application April 22, 1955, Serial No. 503,164

9 Claims. (Cl. 198—192)

This invention relates generally to endless conveyors and more particularly to an improved cable assembly for supporting the conveying reach of an endless conveyor.

According to the present invention such an assembly comprises a number of stationary side by side cables which are connected at their ends to a common cross member, such cross member being anchored in a fashion as to impose a desired degree of tension on the assemblies when connected in end to end fashion.

One of the principal objects of the invention is to provide an assembly for supporting the conveying reach of an endless conveyor, which assembly may be readily connected to like assemblies whereby new sections may be added to the conveyor as it needs to be lengthened in following the mining operation in a mine underground, for example.

Other objects and important features of the invention will be apparent from a study of the specification following taken with the drawings which together disclose a preferred embodiment of the invention and what is now considered to be the best mode of practicing the principles thereof. Other embodiments may be suggested to those having the benefit of the teachings herein, and it is therefore intended that the scope of the invention not be limited by the precise embodiment herein shown, such other embodiments intended to be reserved especially as they fall within the scope and purview of the subjoined claims.

In the drawings:

Fig. 3 is a perspective view of a support assembly for the belt conveyor shown in Figs. 1 and 2, said support assembly being constructed in accordance with the teachings of the invention herein;

Fig. 4 is an elevation view showing the troughing rollers caried by the support assembly shown in Fig. 3, and showing in transverse section the contour adopted by the conveying reach of the belt in moving over the troughing rollers shown, said view being taken substantially along the plane 4—4 of Fig. 3 and looking in the direction of the arrows;

Fig. 5 is a detail elevation view of a different arrangement whereby the troughing rollers may be held to the cables of the support assembly seen in Fig. 3; and Fig. 6 is an end elevation view of the troughing roller shown in Fig. 5 showing further details thereof.

Figure 1:
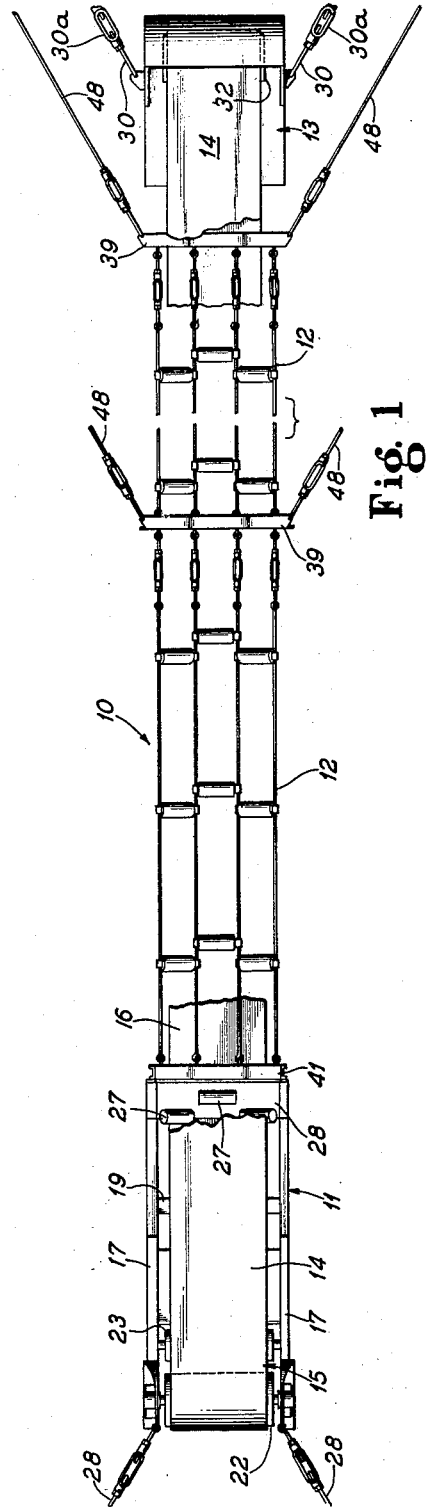
Fig. 1 is a plan view of a belt conveyor having the improvements according to the present invention embodied therein.
Figure 2:
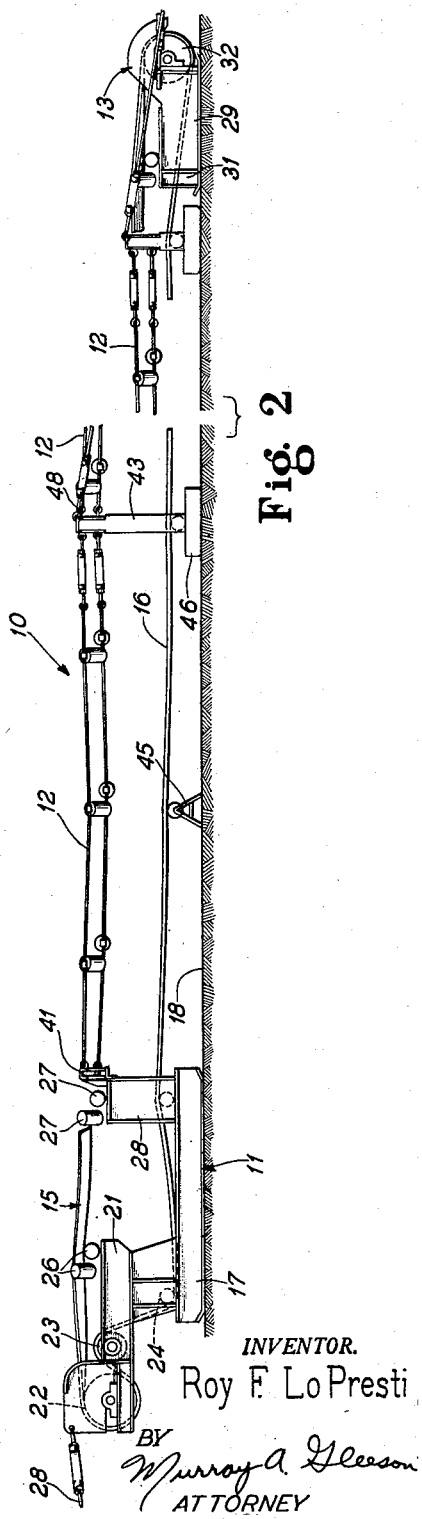
Fig. 2 is a front elevation view thereof.

Referring now particularly to Figs. 1 and 2 of the drawings, there is shown an endless conveyor indicated by the reference numeral 10 and consisting of an outby or discharge section 11, intermediate sections 12 connected together in end to end relationship and an inby section 13. The outby section 11, the intermediate sections 12 and the inby section 13 afford a means of support for a belt 15 having a conveying reach 14 and a return reach 16.

Referring now to the outby or discharge section 11, it consists of laterally spaced skids 17 adapted to rest on a mine floor 18 or the like. The skids 17 are maintained in spaced relationship by laterally extending members 19, and the skids 17 afford a support for a structure indicated generally by the reference numeral 21. A drive pulley 22 containing therewithin a driving motor, not shown, is mounted on the support structure 21, and drives the belt 15. The belt 15 is reversed in direction around an idler pulley 23 supported by the structure 21 and beneath an idler roller 24 also supported by the structure 21.

The structure 21 also affords a means of support for troughing rollers 26, and similar troughing rollers 27 are supported upon a standard 28 at the other end of the skids 17.

The outby section 11 is held in position by cables 28 which may be anchored conveniently to a rib of the entry within which the belt conveyor 10 operates.

The inby section 13 also consists of skids 29 which together with a structure 31 supported thereon provides a support for an idler pulley 32 around which the belt 15 is reversed in direction. The inby section 13 may be anchored to the rib of the entry by cables 30 having turnbuckles 30a therein for adjustment.

The outby unit 11 and the inby unit 13 are joined by intermediate belt support assemblies or sections 12 which are connected in end to end relationship and which are described with particular reference to Fig. 3. Each of the support assemblies 12 includes laterally spaced stationary flexible strands 33 and 34, and a similar pair of stationary flexible strands 36 and 37 are spaced inwardly of the flexible strands 33 and 34 and below the plane defined thereby, in the manner shown in Figs. 3 and 4. These strands are each provided with means 38 whereby they are joined at their outby end to a cross member or saddle 39. As seen in Figs. 1 and 2 the outby end of the intermediate section 12 adjacent to the outby section 11 has the flexible strands thereof connected to a cross member or saddle 41 similar to the saddle 39. The inby ends of the flexible strands 33 and 34, 36 and 37 are each provided with turnbuckles 32 for adjustment of the length of the strands, and each turnbuckle is connected in the manner shown to the saddle 39 of the next inby unit.

Each cross member or saddle 39 is supported upon standards 43 which are held in spaced relationship by channel members 44, the lower ends of the standards 43 terminating in feet 46 arranged to rest on the floor 18. As seen in Fig. 3 the support 43 has extending therebetween an idler roller 47 for the return reach 16 of the belt 15.

Referring back to Fig. 2, the return reach 16 may also be supported upon an idler assembly indicated generally by the reference numeral 45, so as to keep same out of contact with the floor 18.

The proper amount of tension may be placed upon the cables 33, 34 and 36 and 37 to prevent sagging thereof by means of cables 48 adjusted in their length by turnbuckles 49 and anchored at 51 to the ends of the saddles 39. The cables 48 may, as with the cables 28 be anchored to the rib of the cross entry in which the conveyor 10 operates.

The stationary flexible strands 33, 34 and 36 and 37 support troughing rollers 52, 53 and 54 which are located at intervals throughout the length of the several strands so as to cause the conveying reach 14 to have the contour in the manner shown in Fig. 4. Each of the troughing rollers 52, 53 and 54 has a stub shaft 56, the ends of which having welded thereto an inverted U-shaped stirrup 57, arranged to ride upon the flexible strand as shown in Fig. 4. A set screw 58 may be threaded to one limb of the inverted stirrup 57 so as to prevent dislodgement of the rollers from their support cables.

Referring now to Figs. 5 and 6, the troughing rollers may be held to the stationary flexible strands by a spring clip 59 arranged to seat in a notch 61 on the stub shaft and having arms terminating in hooks 63 which partly encircle the cable or flexible strand. The underside of the stub shaft 56 is preferably notched as at 64 to provide a seat for the cable shown.

It is believed evident that new sections 12 may be added to the conveyor 10 in accordance with the advance, for example, of a continuous miner which it serves. The inby unit 13 may be advanced to a new position after opening the splice of the conveyor belt 15, a new section 12 inserted and held in place by the cables 48. Proper tension of the belt 15 may be had by the cables 30 and the turnbuckles 30a.

After the cables 48 of the inby unit of the intermediate units 12 have been secured, cables 48 of the next outby unit shown in Fig. 1 may be loosened. Theoretically only the inby unit need be so held in position by the cables 48.

The flexible strands 33, 34, 36 and 37 between each cross member 39 are suspended as a lightly loaded catenary, all of the weight thereon, and the tension in the cables being transmitted into the standards 43. Theoretically, therefore, the cables 48 at the inby end of the inby unit 12 need take only the tension of the flexible strands, while cables 28 at the outby unit take the tension of the strands plus the tension in the belt 15. Obviously, cables 30 take only the tension of the belt 15.

While the invention has been described in terms of a preferred embodiment, its scope is intended to be defined only by the claims here appended.

I claim as my invention:

1. A support assembly for the conveying reach of an endless belt conveyor, said support assembly comprising a pair of stationary laterally spaced flexible strands, a plurality of roller means spanning the distance between said flexible strands and spaced throughout the length thereof for transferring the load on said reach into said strands, a cross member at each end of said flexible strands providing points of connection therefor, at least one stationary flexible strand extending along an axis which lies between said flexible strands and spaced from the plane defined thereby, said one flexible strand being also connected at each end to said cross members, a standard supporting said cross members, and means connected to one of said cross members and anchored at a remote point for imposing tension on said stationary flexible strands.

2. A support assembly for the conveying reach of an endless belt conveyor, said support assembly comprising a pair of stationary laterally spaced flexible strands, a plurality of roller means spanning the distance between said flexible strands and spaced throughout the length therefor for transferring the load on said reach into said strands, a cross member at each end of said flexible strands providing points of connection therefor, at least one stationary flexible strand extending along an axis which lies between said flexible strands and spaced from the plane defined thereby, said one flexible strand being also connected at each end to said cross members, and a standard supporting each of said cross members.

3. A support assembly for the conveying reach of an endless belt conveyor, said support assembly comprising a pair of stationary laterally spaced flexible strands, a plurality of roller means spanning the distance between said flexible strands and spaced throughout the length thereof for transferring the load on said reach into said strands, a cross member at each end of said flexible strands providing points of connection therefor, at least one flexible strand extending along an axis which lies between said flexible strands and spaced from the plane defined thereby, said one flexible strand being also connected at its ends to said cross members, and means connected to said cross member and anchored at a remote point for imposing tension on said stationary flexible strands.

4. A support assembly for the conveying reach of an endless belt conveyor, said support assembly comprising a pair of stationary laterally spaced flexible strands, a plurality of roller means spanning the distance between said flexible strands and spaced throughout the length thereof for transferring the load on said reach into said strands, a cross member at each end of said flexible strands providing points of connection therefor, at least one stationary flexible strand extending along an axis which lies between said flexible strands and spaced from the plane defined thereby, said one flexible strand being also connected at its ends to said cross members, and means extending from the outer to the intermediate of said flexible strands to provide spaced supports for said conveying reach.

5. A support assembly for the conveying reach of an endless conveyor, said support assembly comprising a pair of stationary laterally spaced flexible strands, a second pair of stationary flexible strands spaced from and below the plane defined by said first named flexible strands and inwardly therefrom, a plurality of roller means spanning the distance between said flexible strands and spaced throughout the length thereof for transferring the load on said reach into said strands, a cross member at each end of said flexible strands providing points of connection therefor, a standard supporting each of said cross members, and means connected to one of said cross members and anchored at a remote point for imposing tension on said stationary flexible strands.

6. A support assembly for the conveying reach of an endless belt conveyor, said support assembly comprising a pair of stationary laterally spaced flexible strands, a second pair of stationary flexible strands spaced from and below the plane defined by said first named flexible strands and inwardly therefrom, a plurality of roller means spanning the distance between said flexible strands and spaced throughout the length thereof for transferring the load on said reach into said strands, a cross member at each end of said flexible strands providing points of connection therefor, and a standard supporting each of said cross members.

7. A support assembly for the conveying reach of an endless belt conveyor, said support assembly comprising a pair of stationary laterally spaced flexible strands, a second pair of stationary flexible strands spaced from and below the plane defined by said first named flexible strands and inwardly therefrom, a plurality of roller means spanning the distance between said flexible strands and spaced throughout the length thereof for transferring the load on said reach into said strands, a cross member at each end of said flexible strands providing points of connection therefor, and means connected to one of said cross members and anchored at a remote point for imposing tension on said flexible strands.

8. A support assembly for the conveying reach of an endless belt conveyor, said support assembly comprising a pair of stationary laterally spaced flexible strands, a second paid of stationary flexible strands spaced from and below the plane defined by said first named flexible strands and inwardly therefrom, and roller means extending across adjacent flexible strands and supported thereby to provide spaced supports for said conveying reach.

9. A support assembly for the conveying reach of an endless conveyor, said support assembly comprising a pair of stationary laterally spaced flexible strands, at least one stationary flexible strand spaced below the plane defined by said first named flexible strands and inwardly therefrom, and roller means extending across adjacent flexible strands and supported thereby to provide spaced supports for said conveying reach.

References Cited in the file of this patent

UNITED STATES PATENTS

| 404,424 | Nogar | June 4, 1889 |
| 843,018 | Jamieson | Feb. 5, 1907 |
| 1,651,253 | Clifford | Nov. 29, 1927 |
| 1,970,842 | Crossen | Aug. 21, 1934 |

UNITED STATES PATENT OFFICE

CERTIFICATE OF CORRECTION

Patent No. 2,833,395                                                       May 6, 1958

Roy F. Lo Presti

It is hereby certified that error appears in the printed specification of the above numbered patent requiring correction and that the said Letters Patent should read as corrected below.

Column 3, line 49, for "therefor" read -- thereof --; column 4, line 55, for "paid" read -- pair --.

Signed and sealed this 8th day of July 1958.

(SEAL)
Attest:

KARL H. AXLINE
Attesting Officer

ROBERT C. WATSON
Commissioner of Patents